United States Patent
Zhu

(10) Patent No.: US 8,983,521 B2
(45) Date of Patent: Mar. 17, 2015

(54) PILOT POWER SETTING METHOD AND FEMTOCELL USING THE SAME

(75) Inventor: Ling Zhu, Su Zhou (CN)

(73) Assignee: Sernet (Suzhou) Technologies Corporation, Jiangsu (CN)

(*) Notice: Subject to any disclaimer, the term of this patent is extended or adjusted under 35 U.S.C. 154(b) by 386 days.

(21) Appl. No.: 13/591,686

(22) Filed: Aug. 22, 2012

(65) Prior Publication Data

US 2013/0053021 A1 Feb. 28, 2013

(30) Foreign Application Priority Data

Aug. 23, 2011 (CN) .......................... 2011 1 0242417

(51) Int. Cl.
| | |
|---|---|
| H04W 52/00 | (2009.01) |
| H04W 52/32 | (2009.01) |
| H04W 24/02 | (2009.01) |
| H04W 84/04 | (2009.01) |
| H04W 52/22 | (2009.01) |
| H04W 52/24 | (2009.01) |
| H04W 24/10 | (2009.01) |

(52) U.S. Cl.
CPC .......... *H04W 52/325* (2013.01); *H04W 52/223* (2013.01); *H04W 52/242* (2013.01); *H04W 52/244* (2013.01); *H04W 24/02* (2013.01); *H04W 24/10* (2013.01); *H04W 84/045* (2013.01); *H04B 17/327* (2015.01); *H04B 17/373* (2015.01)
USPC .......................... 455/522; 455/422.1; 370/329

(58) Field of Classification Search
USPC ...................................................... 455/422.1
See application file for complete search history.

(56) References Cited

U.S. PATENT DOCUMENTS

| | | | |
|---|---|---|---|
| 8,594,647 B2 | 11/2013 | Huang | |
| 2012/0039265 A1* | 2/2012 | Patel et al. | 370/329 |
| 2012/0142392 A1* | 6/2012 | Patel et al. | 455/522 |

FOREIGN PATENT DOCUMENTS

| | | |
|---|---|---|
| CN | 1913386 A | 2/2007 |
| CN | 101674600 A | 3/2010 |

OTHER PUBLICATIONS

Full English (machine) translation of CN1913386A (Published Feb. 14, 2007).
CN Office Action dated Sep. 1, 2014.

* cited by examiner

*Primary Examiner* — Mazda Sabouri
(74) *Attorney, Agent, or Firm* — McClure, Qualey & Rodack, LLP

(57) ABSTRACT

A pilot power setting method and a femtocell using the same are disclosed. The pilot power setting method is for using in a femtocell which is operated in a closed mode to provide service to a user equipment (UE). The method includes the following steps. A communication link connecting the UE and the femtocell is established. A command is provided to the UE, which returns n items of path loss information to the femtocell in a pre-determined period according to the command, wherein n is a natural number which is greater than 1. A maximum path loss information between the UE and the femtocell is obtained from the n items of path loss information in the pre-determined period. A predicted pilot power is obtained according to the maximum path loss information. A pilot power of the femtocell is set according to the predicted pilot power.

6 Claims, 3 Drawing Sheets

PILOT POWER SETTING METHOD AND FEMTOCELL USING THE SAME

This application claims the benefit of People's Republic of China application Ser. No. 201110242417.5, filed Aug. 23, 2011, the subject matter of which is incorporated herein by reference.

BACKGROUND OF THE INVENTION

1. Field of the Invention

The invention relates in general to a pilot power setting method and a femtocell using the same, and more particularly to a pilot power setting method for using in a femtocell and a femtocell using the same.

2. Description of the Related Art

The femtocell technology has been developed to provide convenience to people in their everydayness. The femtocell is mostly used in a household or small office environment. The femtocell is linked to a system provider network via broadband for connecting the micro communication base station of the system provider network and the user equipment (UE) (such as a mobile phone) of the household or small office environment. In other words, through the disposition of the femtocell, the system provider network is extended to the household or small office environment.

Of the current technologies, the pilot power of the femtocell is mostly set by the network administrator by way of manual adjustment. As the femtocell becomes more and more popular, the current method will not be cost-wise in the future. Therefore, how to design a more efficient pilot power setting method has become a prominent task for the industries.

SUMMARY OF THE INVENTION

The invention is directed to a pilot power setting method and a femtocell using the same. A communication link between the femtocell and the user equipment (UE) is established. A command is provided to control the UE to return many items of path loss information to the femtocell in a pre-determined period. A maximum path loss information between the UE and the femtocell is obtained from the many items of path loss information in the pre-determined period. The pilot power setting method and the femtocell using the same of the invention further obtain a pilot power of the femtocell according to the maximum path loss information. As such, in comparison to the conventional femtocell, the pilot power setting method and the femtocell using the same the invention are advantageously capable of having the pilot power configured automatically.

According to a first aspect of the present invention, a pilot power setting method is disclosed. The pilot power setting method is for using in a femtocell which is operated in a closed mode to provide service to a user equipment (UE). The pilot power setting method includes the following steps. A communication link connecting the UE and the femtocell is established. A command is provided to the UE, which returns n items of path loss information to the femtocell in a pre-determined period according to the command, wherein n is a natural number which greater than 1. A maximum path loss information between the UE and the femtocell is obtained from the n items of path loss information in the pre-determined period. A predicted pilot power is obtained according to the maximum path loss information. A pilot power of the femtocell is set according to the predicted pilot power.

According to a second aspect of the present invention, a femtocell operated in a closed mode is disclosed for providing service to UE is provided. The femtocell includes a communication unit, a controlling unit, a path loss calculation unit and a pilot power setting unit. The communication unit is used for establishing a communication between the UE and the femtocell. The controlling unit is used for providing a command to the UE, which returns n items of path loss information to the femtocell in a pre-determined period according to the command, wherein n is a natural number which is greater than 1. The path loss calculation unit is used for obtaining a maximum path loss information between the UE and the femtocell from the n items of path loss information in the pre-determined period. The pilot power setting unit is used for obtaining a predicted pilot power according to the maximum path loss information and for setting a pilot power of the femtocell according to the predicted pilot power.

The above and other aspects of the invention will become better understood with regard to the following detailed description of the preferred but non-limiting embodiment(s). The following description is made with reference to the accompanying drawings.

DETAILED DESCRIPTION OF THE INVENTION

The principles of the structure and operations of the invention are disclosed below with detailed descriptions and accompanying drawings.

Figure 1:
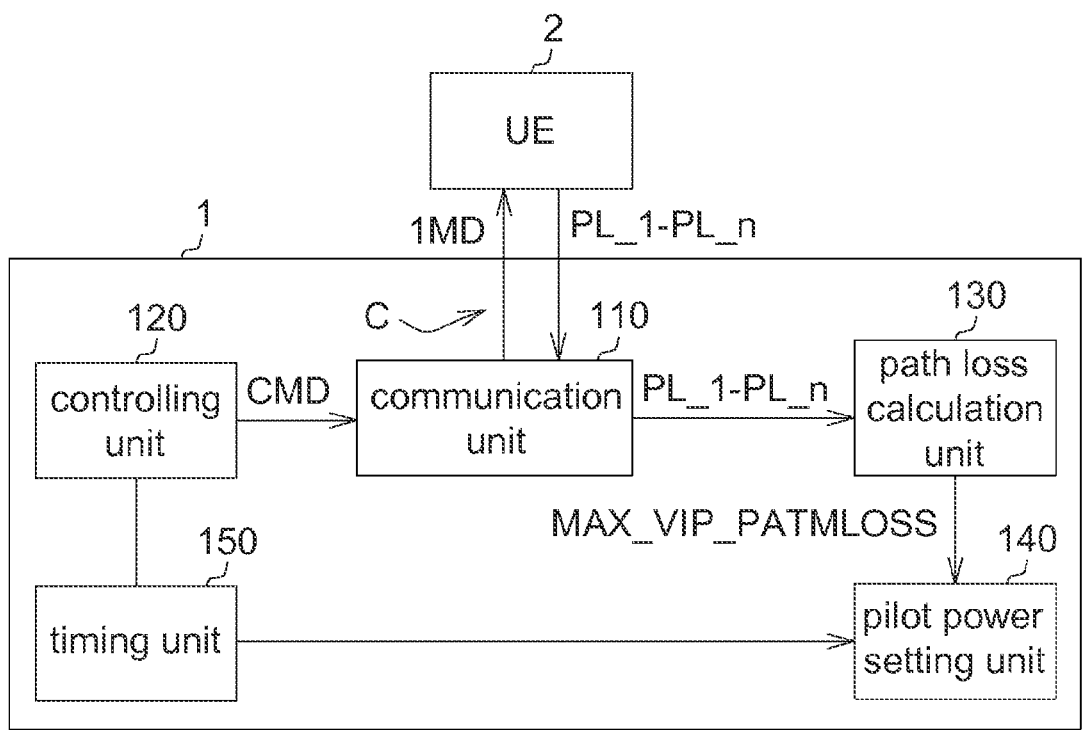
FIG. 1 shows a block diagram of a femtocell according to an embodiment of the invention.

Referring to FIG. 1, a block diagram of a femtocell according to an embodiment of the invention is shown. The femtocell 1 of the invention is operated in a closed mode for providing service to at least one user equipment (UE) having a special identification. In the present embodiment, the femtocell 1 provides service to one UE 2.

The femtocell 1 includes a communication unit 110, a controlling unit 120, a path loss calculation unit 130 and a pilot power setting unit 140. The controlling unit 120 and the path loss calculation unit 130 are coupled to the communication unit 110, and the path loss calculation unit 130 is coupled to the pilot power setting unit 140.

The communication unit 110 establishes a communication link C between the UE 2 and the femtocell 1. The controlling unit 120 provides a command CMD to the UE 2 according to the command CMD, and returns n items of path loss messages PL_1, PL_2, . . . , PL_n to the femtocell 1 in a pre-determined period, wherein n is a natural number which is greater than 1.

For example, the command CMD is a radio resource control (RRC) command. The UE 2 continually detects the path loss between the UE 2 and the femtocell 1 in the pre-determined period according to the command CMD, and correspondingly returns n items of path loss information PL_1-PL_n.

The path loss calculation unit 130 obtains a maximum path loss information MAX_VIP_PATHLOSS (t0) between the UE 2 and the femtocell 1 according to the path loss information PL_1-PL_n in the pre-determined period. The maximum path loss information MAX_VIP_PATHLOSS (t0) is the maximum among the n items of path loss information PL_1-

PL_n. Under the circumstances that the femtocell 1 provides service to many UE (such as j UE), the maximum path loss information MAX_VIP_PATHLOSS (t0) is the maximum of the items of path loss information (such as n×j items of path loss information PL1_1-PL1_n, PL2_1-PL2_n, . . . , PLj_1-PLj_n) returned by the UE in the pre-determined period.

The pilot power setting unit 140 obtains a predicted pilot power P_pilot (t0) according to the maximum path loss information MAX_VIP_PATHLOSS (t0) and accordingly sets a pilot power of the femtocell 1. For example, the pilot power setting unit 140 determines the pilot power according to a received signal code power (RSCP) and a power offset of the UE. In other words, the pilot power setting unit 140 obtains the predicted pilot power P_pilot (t0) according to the following expression:

$$P\_pilot(t0)=MAX\_VIP\_PATHLOSS(t0)+UE\_acceptable\_RSCP+Power\_offset$$

Wherein, the UE_acceptable_RSCP and the power_offset respectively represent the RSCP and the power offset.

Thus, the femtocell 1 may set the pilot power according to the maximum path loss information MAX_VIP_PATHLOSS (t0) of the UE 2 in the pre-determined period.

For example, the femtocell 1 further includes a timing unit 150 coupled to the controlling unit 120 and the pilot power setting unit 140. The timing unit 150 is switched on before the controlling unit 120 provides the command CMD, so as to record the time record TR, starting from the time point that the controlling unit 120 provides the command CMD.

After the pilot power setting unit 140 obtains the predicted pilot power P_pilot (t0), the timing unit 150 determines whether the time record TR is reached to a predetermined measuring time value. If the time record TR is not reached to the predetermined measuring time value, the timing unit 150 drives the controlling unit 120, the path loss calculation unit 130 and the pilot power setting unit 140 to repeat their operations to correspondingly obtain another maximum path loss information MAX_VIP_PATHLOSS (t0+1) corresponding in the next pre-determined period and the corresponding predicted pilot power P_pilot (t0+1).

If the time record TR is reached to the predetermined measuring time value, it is indicated that the femtocell 1 has been performed for a time at least longer the predetermined set time value and many items of the pilot power are obtained. Accordingly, the femtocell 1 terminates its pilot power setting operation and sets the pilot power according to the lastly obtained predicted pilot power, such as the predicted pilot power P_pilot (t0).

Figure 2:
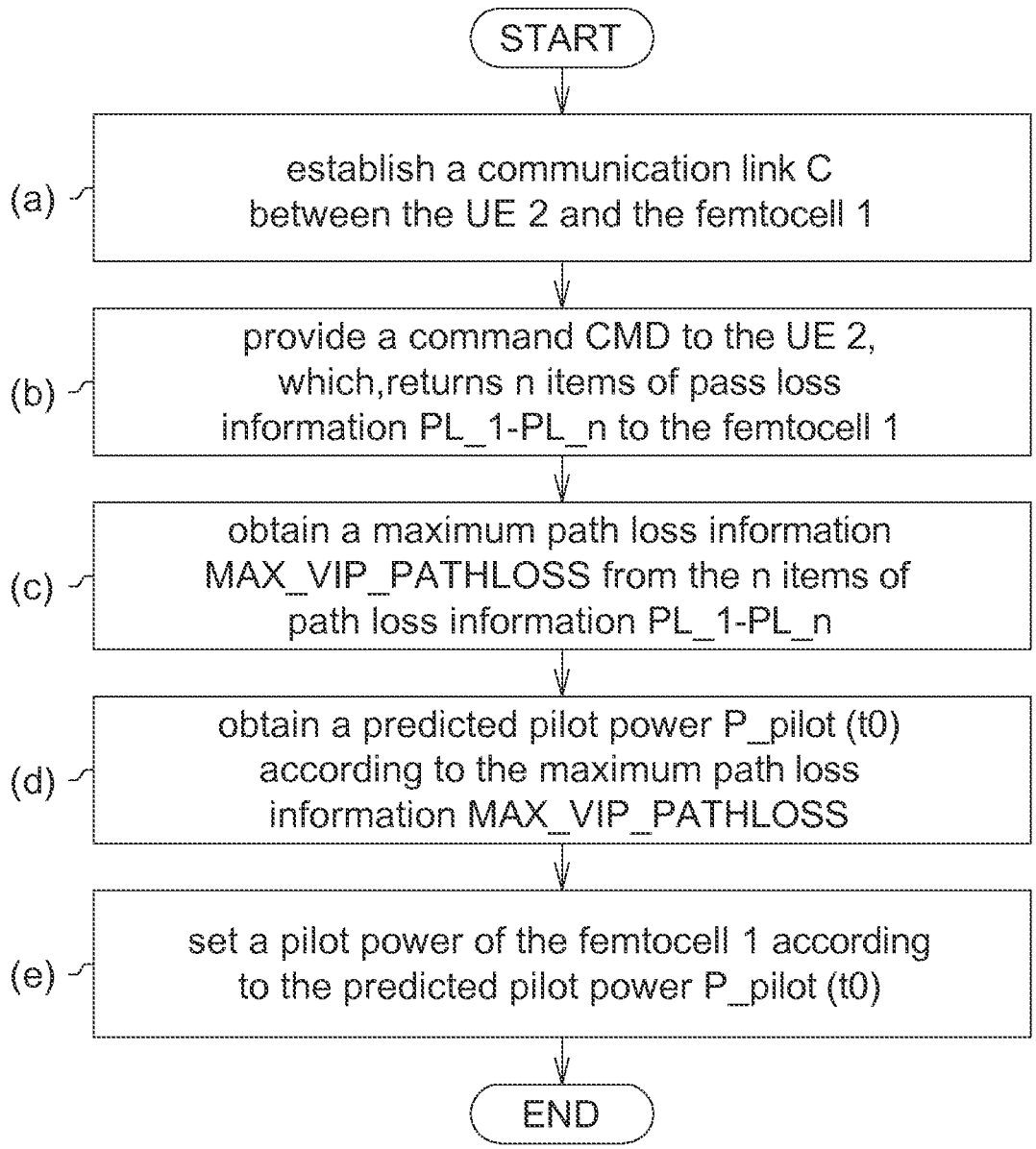
FIG. 2 shows a flowchart of a pilot power setting method according to an embodiment of the invention.

Referring to FIG. 2, a flowchart of a pilot power setting method according to an embodiment of the invention is shown. The pilot power setting method of the present embodiment of the invention is for using in the femtocell 1 operated in a closed mode for providing service to at least one UE 2. The pilot power setting method includes the following steps. Firstly, in step (a), the communication unit 110 establishes the communication link C between the UE 2 and the femtocell 1.

Next, in step (b), the controlling unit 120 provides the command CMD to the UE 2, which returns n items of path loss information PL_1-PL_n to the femtocell 1 in the pre-determined period according to the command CMD. Then, in step (c), the path loss calculation unit 130 obtains the maximum path loss information MAX_VIP_PATHLOSS between the UE 2 and the femtocell 1 from the n items of path loss information PL_1-PL_n in the pre-determined period.

Then, in step (d), the pilot power setting unit 140 obtains the predicted pilot power P_pilot (t0) according to the maximum path loss information MAX_VIP_PATHLOSS. Afterwards, in step (e), the pilot power setting unit 140 sets the pilot power of the femtocell 1 according to the predicted pilot power P_pilot (t0).

Figure 3:
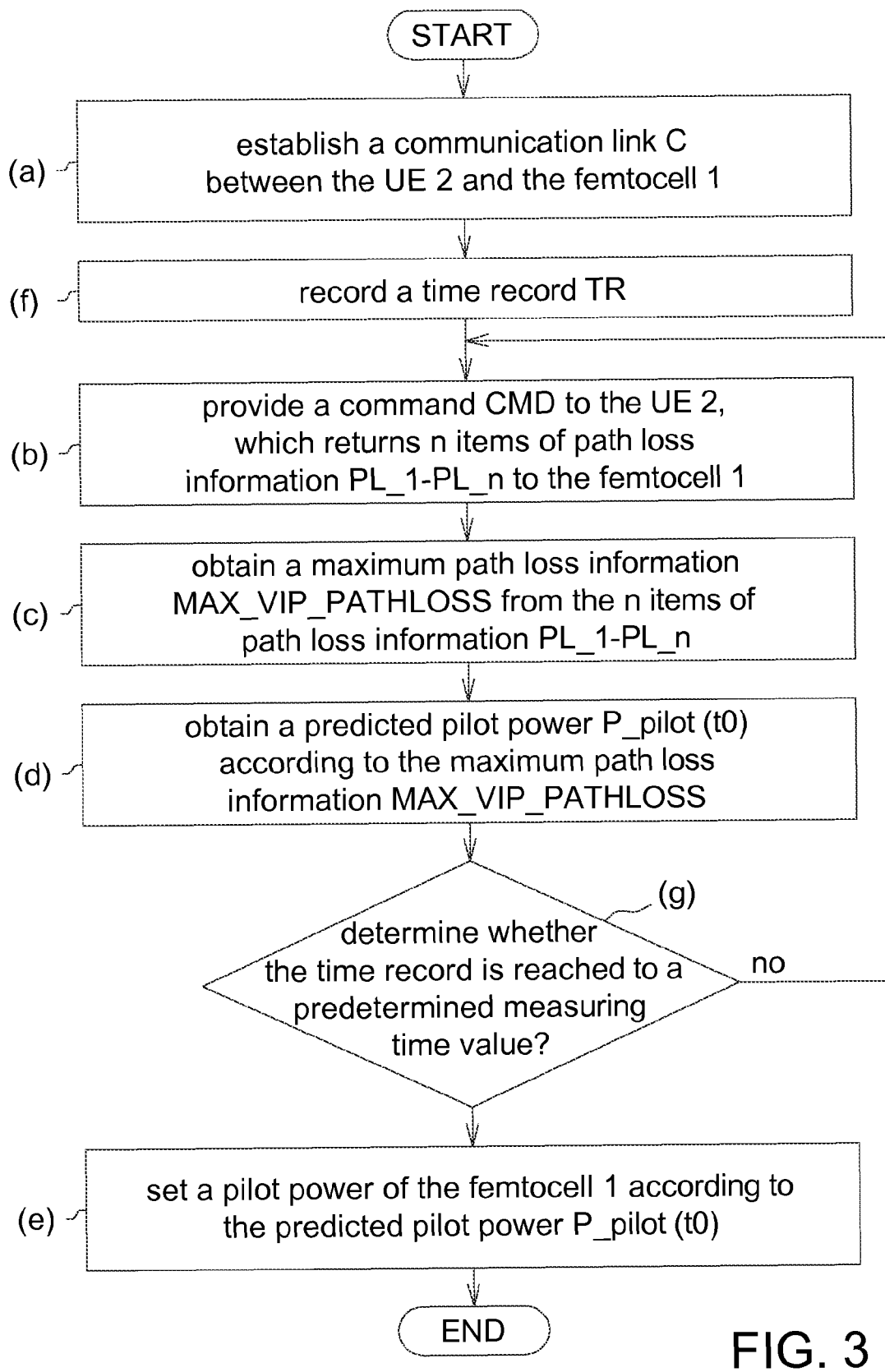
FIG. 3 shows another flowchart of a pilot power setting method according to an embodiment of the invention.

Referring to FIG. 3, another flowchart of a pilot power setting method according to an embodiment of the invention is shown. In other examples, the pilot power setting method further includes steps (f) and (g), respectively performed before step (b) and after step (d).

After step (a), the pilot power setting method proceeds to step (f), in which the timing unit 150 records the time record TR. After step (d), the pilot power setting method proceeds to step (g), in which the timing unit 150 determines whether the time record TR is reached to the predetermined measuring time value. If the time record TR is not reached to the predetermined measuring time value, then the pilot power setting method repeats steps (b) and (c) to obtain another maximum path loss information MAC_VIP_PATHLOSS (t0+1) and the predicted pilot power P_pilot (t0+1) in the next pre-determined period.

Following step (g), if the time record TR is reached to the predetermined measuring time value, it is indicated that the pilot power setting operation of the femtocell 1 has been performed for a time longer than the predetermined set time value and many items of the pilot power are obtained. In step (e), the femtocell 1 terminates its pilot power setting operation, and the pilot power setting unit 140 sets the pilot power of the femtocell 1 according to the lastly obtained predicted pilot power, such as the predicted pilot power P_pilot (t0).

A pilot power setting method and a femtocell are proposed in the present embodiment of the invention. A communication link between the femtocell and the user equipment (UE) is established. A command is provided to control the UE to return many items of path loss information to the femtocell in a pre-determined period. A maximum path loss information between the UE and the femtocell is obtained from the many items of path loss information in the pre-determined period. The pilot power setting method and the femtocell of the invention further obtain a pilot power of the femtocell according to the maximum path loss information. As such, in comparison to the conventional femtocell, the pilot power setting method and the femtocell according to the present embodiment of the invention are advantageously capable of having the pilot power configured automatically.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A pilot power setting method for using in a femtocell which is operated in a closed mode to provide service to a user equipment (UE), wherein the pilot power setting method comprises:
   (a) establishing a communication link connecting the UE and the femtocell;
   (b) providing a command to the UE, which returns n items of path loss information to the femtocell in a pre-determined period according to the command, wherein n is a natural number which is greater than 1;
   (c) obtaining a maximum path loss information between the UE and the femtocell from the n items of path loss information in the pre-determined period;
   (d) obtaining a predicted pilot power according to the maximum path loss information; and (e) setting a pilot power of the femtocell according to the predicted pilot power;

wherein before step (b) and after step (d), the pilot power setting method further comprises:

(f) recording an operation time; and (g) determining whether the operation time is reached to a predetermined measuring time value, wherein if the operation time is not reached to the predetermined measuring time value, then the pilot power setting method repeats steps (b) and (c) to obtain another maximum path loss information in the next pre-determined period.

2. The pilot power setting method according to claim 1, wherein in step (d), the pilot power is set according to a received signal code power (RSCP) of the UE.

3. The pilot power setting method according to claim 1, wherein the command is a wireless controlling command.

4. A femtocell operated in a closed mode for providing service to a user equipment (UE), wherein the femtocell comprises:

a communication unit used for establishing a communication between the UE and the femtocell;

a controlling unit used for providing a command to the UE, which returns n items of path loss information to the femtocell in a pre-determined period according to the command, wherein n is a natural number which is greater than 1;

a path loss calculation unit used for obtaining a maximum path loss information between the UE and the femtocell from the n items of path loss information in the pre-determined period; and a pilot power setting unit used for obtaining a predicted pilot power according to the maximum path loss information and setting a pilot power of the femtocell according to the predicted pilot power;

a timing unit used for recording a time record before the controlling unit provides the command;

wherein, the timing unit further determines whether the time record is reached to a predetermined measuring time value, after the pilot power calculation unit obtains the pilot power; and if the time record is not reached to the predetermined measuring time value, then the controlling unit and the path loss calculation unit repeat their operations to obtain another maximum path loss information in the next pre-determined period.

5. The femtocell according to claim 4, wherein the pilot power calculation unit further sets the pilot power according to a received signal code power (RSCP) of the UE.

6. The femtocell according to claim 4, wherein the command provided by the controlling unit is a wireless controlling command.

* * * * *